(12) United States Patent
Major (10) Patent No.: US 7,942,116 B2
(45) Date of Patent: May 17, 2011

(54) DOUBLE ACTION PISTON ASSEMBLY

(76) Inventor: Jean-Louis Major, Hornby (CA)

( * ) Notice: Subject to any disclaimer, the term of this patent is extended or adjusted under 35 U.S.C. 154(b) by 592 days.

(21) Appl. No.: 10/599,554

(22) PCT Filed: Mar. 30, 2005

(86) PCT No.: PCT/CA2005/000462
§ 371 (c)(1),
(2), (4) Date: Sep. 15, 2008

(87) PCT Pub. No.: WO2005/095770
PCT Pub. Date: Oct. 13, 2005

(65) Prior Publication Data
US 2009/0007861 A1    Jan. 8, 2009

(30) Foreign Application Priority Data

Mar. 31, 2004   (CA) ..................................... 2464227

(51) Int. Cl.
*F02B 33/06* (2006.01)
*F02B 33/04* (2006.01)
(52) U.S. Cl. .......... 123/62; 123/25 R; 123/66; 123/71 R
(58) Field of Classification Search ...... 123/25 R–25 M, 123/54.1, 55.2, 55.6, 55.7, 58.3, 61 R, 62, 123/61 V, 66, 68, 69 R, 69 V, 70 R, 70 V, 123/71 R, 71 V
See application file for complete search history.

(56) References Cited

U.S. PATENT DOCUMENTS

| | | | |
|---|---|---|---|
| 567,530 A | 9/1896 | Willetts | |
| 912,751 A | 2/1909 | Steely | |
| 1,900,858 A * | 3/1933 | Bruckner | ..................... 123/58.6 |
| 2,339,848 A | 1/1944 | Feeney | |
| 4,385,597 A | 5/1983 | Stelzer | |
| 4,627,389 A | 12/1986 | Simon | |
| 5,884,590 A | 3/1999 | Minculescu | |

FOREIGN PATENT DOCUMENTS

| | | |
|---|---|---|
| WO | 98/13592 | 4/1998 |
| WO | 98/49434 | 11/1998 |

* cited by examiner

*Primary Examiner* — Noah Kamen
(74) *Attorney, Agent, or Firm* — Rolf Fasth; Fasth Law Offices (57) ABSTRACT

The double action piston assembly is for an internal combustion engine and has a combustion chamber that has a double action piston connected to one end of a central power rod disposed within the combustion chamber. A first intake air port and a first exhaust port are located in the up side of the combustion chamber. A compression chamber is connected to the combustion chamber. A central power rod passes through the combustion chamber into the compression chamber and out the compression chamber. A fuel mixture is fed into the combustion chamber and ignition means adjacent to combustion chamber to ignite the fuel mixture. At the end of each stroke, the compression exhaust valves are opened and the intake ports and the exhaust ports are open to permit air from the compression chamber to pass through the conduits into the combustion chamber for full scavenging of the combustion chamber.

9 Claims, 8 Drawing Sheets

DOUBLE ACTION PISTON ASSEMBLY

PRIOR APPLICATION

This application is a U.S. national phase application based on International Application No. PCT/CA2005/000462, filed 30 Mar. 2005, claiming priority from Canadian Patent Application No. 2,464,227, filed 31 Mar. 2004.

BACKGROUND OF THE INVENTION

1. Field of the Invention

This invention relates to an internal combustion engine. In particular the present invention provides a double action piston driven in both the up stroke and the down stroke.

2. Description of the Prior Art

Internal combustion engines using a reciprocating piston have been around for many years. The engines operate on the principle of exploding gases forcing a piston downwardly in a cylinder transferring the power to a drive mechanism. Such engines typically provide a single cycle of operation (intake, compression, power and exhaust) over four strokes of a piston. These engines provide for power on only the power stroke. The intake, compression and exhaust strokes require an input of auxiliary power to achieve the necessary function. In the original designs of engines, the auxiliary power was provided by flywheels which stored some of the energy developed by the power stroke and fed it back to the piston to accomplish the exhaust, intake and compression strokes to enable another power stroke to take place. In single cylinder engines, the size of flywheel required was enormous and reduced the potential efficiency of the engine for power output to the drive mechanism.

To provide optimum efficiency for a four stroke engine, a minimum of four cylinders is generally required. In this way one of the four cylinders is always in the power stroke, thus transferring power to the drive mechanism and providing the auxiliary power to operate the other pistons through their exhaust, intake and compression stokes. However, as only one of the four pistons is in the power stroke at any one time, the potential efficiency of the operation of the engine is reduced as some of the output power must be used to drive the other pistons. Even increasing the number of cylinders to more than four, such as six or eight does not overcome this drawback.

The two stroke engine was developed to improve efficiency. In a two stroke engine, the power and intake strokes are combined as are the exhaust and compression. In this way, the piston only requires one up stoke and one down stroke to complete the cycle, thus doubling potential efficiency. However, because of the combination of strokes required in the operation of the two stoke engine, some of this potential efficiency is lost to the decreased efficiency of the combined stroke compared to individual strokes. Other problems are heat generation, shorter operating life, need for lubricating oil to be mixed with fuel and a high level of hydrocarbons in the exhaust.

Alternative forms of internal combustion engines have been developed in attempts to overcome the inefficiencies. For example, Wankel rotary engines have been developed to overcome the need to transform the up and down stroke of the pistons to the circular motion of a drive shaft. The rotary engine uses a rotating piston having multiple faces interacting with the walls of a cylinder to provide varying volumes of chambers as the cylinder rotates to allow for the four stroke operation. While the potential efficiency of the rotary engine is greater than a reciprocating piston engine, the power stroke of the piston is still required to operate the engine through the exhaust, intake and compression strokes.

There still remains a need for a engine with increased efficiency in which the power stroke can provide all of its output to the desired operation of the engine and is not needed to operate the other cylinders through their other strokes.

SUMMARY OF THE INVENTION

It is an object of the invention to provide a piston assembly in which both the up stroke and down stroke of the piston provide power for the operation of an engine.

Thus in accordance with the present invention there is provided a double action piston assembly for an internal combustion engine. The double action piston assembly includes a piston housing defining a combustion chamber having a first end and a second end. The double action piston is positioned within said combustion chamber. The double action piston is connected to a central power rod disposed within said combustion chamber preferably along its longitudinal axis. The double action piston divides the combustion chamber into an up side and a down side. A first intake air port and a first exhaust port are located in the up side of the combustion chamber. A second intake air port and a second exhaust port are located in the down side of the combustion chamber. A valve assembly is provided for opening and closing the first and second intake air ports and first and second exhaust ports. A compression chamber having a first end and a second end is provided with its first end preferably connected to the second end of said combustion chamber. The central power rod passes through the second end of the combustion chamber into the compression chamber, preferably along its longitudinal axis, and out the second end of said compression chamber. A second piston is attached to the central power rod within the compression chamber. The second piston divides the compression chamber into an up side and a down side. A first compression intake valve and a first compression exhaust valve are located in the up side of the combustion chamber. A second compression intake valve and a second compression exhaust valve are located in the down side of the combustion chamber. A first conduit means connects the first intake air port in the combustion chamber with the second compression exhaust valve in the compression chamber and a second conduit means connects the second intake air port in the combustion chamber with the first compression exhaust valve in the compression chamber. Means are provided to alternately feed a fuel mixture into the up side and a down side of the combustion chamber and ignition means are located adjacent the first and second ends of the combustion chamber to ignite said fuel mixture. At the end of each stroke of the double action piston, the first and second compression exhaust valves in said compression chamber are opened and the first and second intake ports and the first and second exhaust ports in said combustion chamber are opened to permit air from the compression chamber to pass through the first and second conduit means into the combustion chamber for full scavenging of the combustion chamber.

Further features of the invention will be described or will become apparent in the course of the following detailed description.

BRIEF DESCRIPTION OF THE DRAWINGS

In order that the invention may be more clearly understood, a preferred embodiment of an engine operating on the principle of the present invention will now be described in detail by way of example, with reference to the accompanying drawings, in which.

DETAILED DESCRIPTION OF THE PREFERRED EMBODIMENT

Referring to the Figures, a schematic representation of one embodiment of a double action piston assembly for an engine according to the present invention is generally indicated at 1.

The double action piston assembly 1 has a piston housing 2 defining a combustion chamber 3. The piston housing 2 has a first end 4 and a second end 5. In the embodiment shown the piston housing 2 is generally cylindrical. Within the combustion chamber 3 is positioned a double action piston 6. The double action piston 6 is connected to a first end 7 of a central power rod 8. The central power rod 8 is preferably positioned in line with the longitudinal axis 9 of the combustion chamber 3. The double action piston 6 divides the combustion chamber 3 into an "up" side 10 and a "down" side 11.

In the up side 10 of combustion chamber 3 adjacent the first end 4 of the piston housing 2, a first air intake means is provided. In the embodiment shown the first air intake means is a first air intake port 12. While the Figures show a single air intake port 12, more than one port can be provided as part of the first air intake means. Also in the up side 10 of combustion chamber 3 adjacent the first end 4 of the piston housing 2, a first exhaust means is provided. In the embodiment shown the first exhaust means is a first exhaust port 13. While the Figures show a single exhaust port 13, more than one port can be provided as part of the first exhaust means.

Similarly in the down side 11 of combustion chamber 3 adjacent the second end 5 of the piston housing 2, a second air intake means is provided. In the embodiment shown the second air intake means is a second air intake port 14. While the Figures show a single air intake port 14, more than one port can be provided as part of the second air intake means. Also in the down side 11 of combustion chamber 3 adjacent the second end 5 of the piston housing 2, a second exhaust means is provided. In the embodiment shown the second exhaust means is a second exhaust port 15. While the Figures show a single exhaust port 15, more than one port can be provided as part of the second exhaust means.

The first and second air intake ports 12,14 and the first and second exhaust ports 13,15 include means for opening and closing the ports 12-15 as described below. The means for opening and closing the ports 12-15 is shown schematically in the Figures but can include mechanical, pneumatic or other conventional methods of opening and closing the ports with the timing as herein after described.

Figure 8:
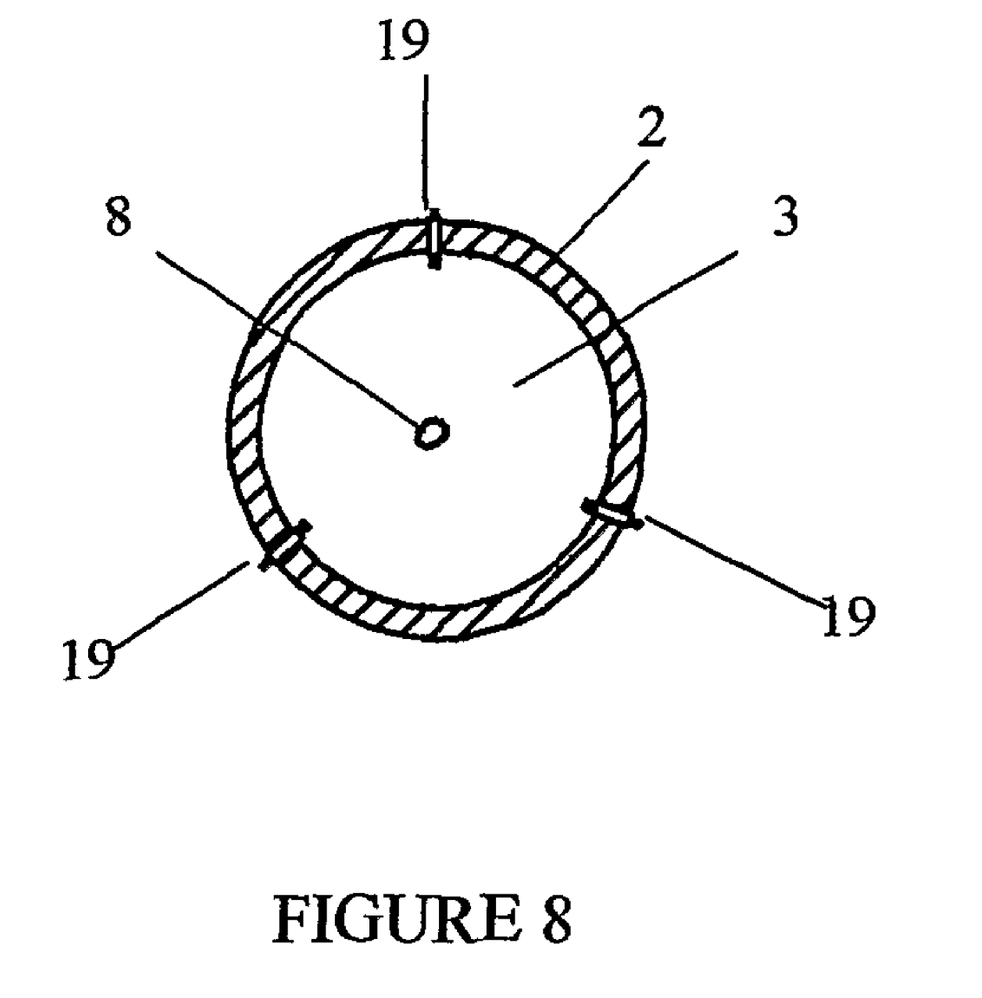
FIG. 8 is a schematic view, in cross section through line A-A, of the combustion chamber of the double action piston assembly of FIG. 7.

The double action piston assembly 1 includes means to feed a fuel mixture alternately to the up side 10 and down side 11 of combustion chamber 3. In the embodiment illustrated, the means to feed a fuel mixture alternately to the up side 10 and down side 11 of combustion chamber 3 is fuel injector 16 located in the up side 10 of combustion chamber 3 and fuel injector 17 located in the down side 11 of combustion chamber 3. Fuel injectors 16, 17 are located adjacent the first end 4 and second end 5 of piston housing 2 respectively. In addition, means to ignite the fuel mixture fed to the up side 10 and down side 11 of combustion chamber 3 are provided. In the embodiment illustrated, the means to ignite the fuel mixture is a spark plug 18 located in the first end 4 of piston housing 2 and three spark plugs 19 (as shown in FIG. 8) located around the periphery of the inside wall 20 of the piston housing 2 adjacent the second end 5 of the piston housing 2.

The inside wall 20 of piston housing 2 may be adapted to withstand the high temperatures generated during combustion while at the same time reducing friction with the double action piston 6 and be resistant to fouling. The embodiment illustrated utilizes a ceramic coating 21 on the inside walls 20 of the piston housing for this purpose.

Around the second end 5 of piston housing 2 is a second piston housing 22 defining a compression chamber 23. The second piston housing 22 has a first end 24 and a second end 25. In the embodiment shown the second piston housing 22 is generally cylindrical and its longitudinal axis 26 is aligned with the longitudinal axis 9 of the combustion chamber 3. Further, in this preferred embodiment, the second end 5 of piston housing 2 is a common wall with the first end 24 of the second piston housing 22. The central power rod 8 exits the combustion chamber 3 through the second end 5 of piston housing 2 and enters the compression chamber 23. The central power rod 8 is preferably positioned in line with the longitudinal axis 26 of the compression chamber 23. Within the compression chamber 23 is positioned a second piston 27. The second action piston 27 is connected to the central power rod 8. The second piston 27 divides the compression chamber 23 into an "up" side 28 and a "down" side 29.

Figure 1:
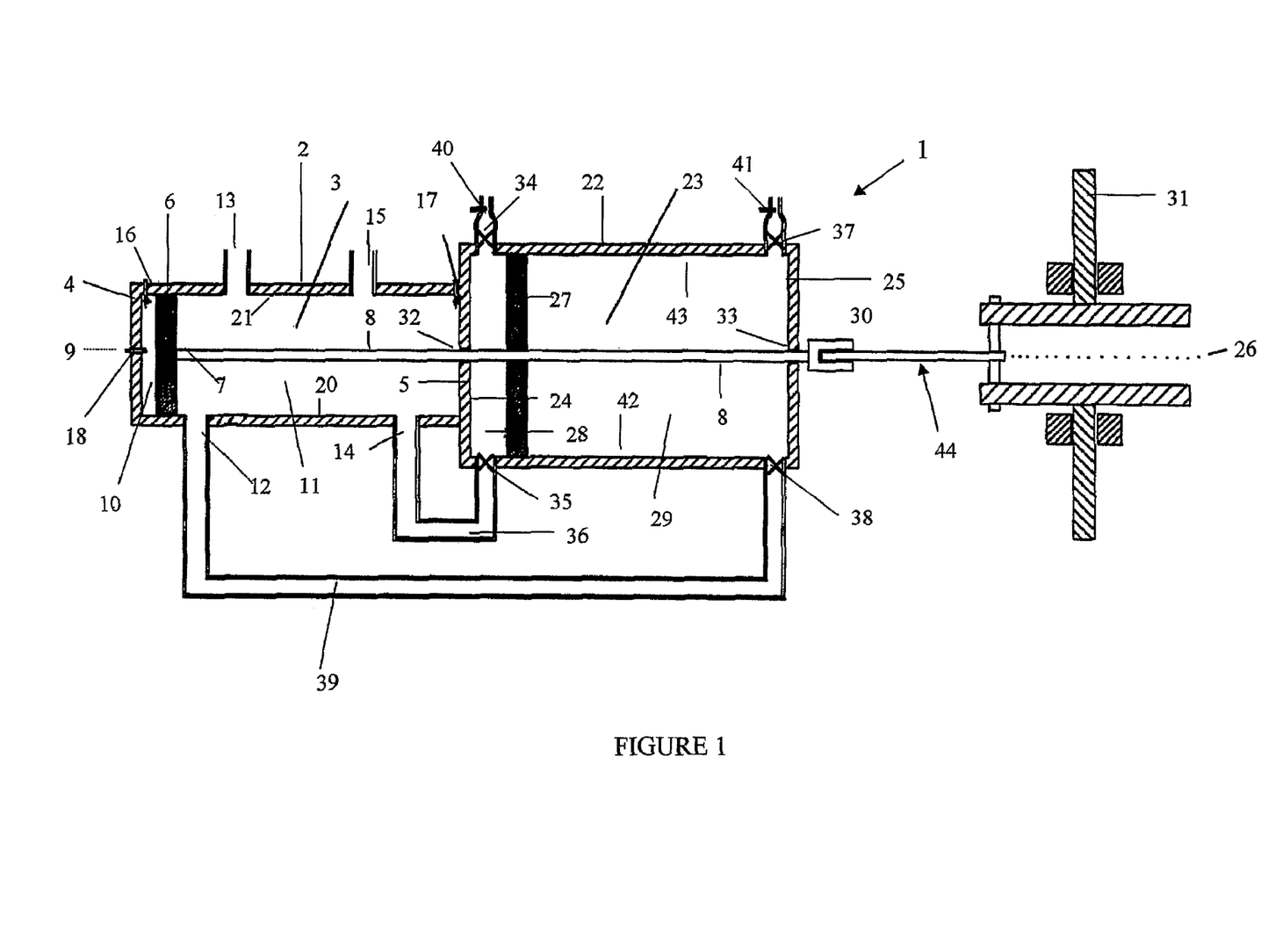
FIG. 1 is a schematic view, in cross section, of an embodiment of double action piston assembly for an engine according to the present invention showing the approximate position of the double action piston at the beginning of a "down" stroke.

The end 30 of the central power rod 8 remote from the double action piston 6 is connected to the output drive of the engine in a conventional manner. For purposes of illustration, the Figures illustrated the output drive as a crankshaft 31. Compression chamber 23 is preferably, as shown in FIG. 1, connected to the second end 5 of piston housing 2 defining the combustion chamber 3. In this arrangement the compression chamber 23 helps provide a seal for exhaust gas leakage around the point 32 power control rod 8 enters combustion chamber 3. A gland ring or other suitable seal may be provided at the point 33 power control rod 8 exits compression chamber 23. Additional compression rings can be provided around the point 32 power control rod 8 enters combustion chamber 3.

In the up side 28 of compression chamber 23 adjacent the first end 24 of the second piston housing 22, a first compression intake means is provided. In the embodiment shown the first compression intake means is a first compression intake valve 34. While the Figures shown a single compression intake valve 34, more than one valve can be provided as part of the first compression intake means. The first compression intake valve 34 is preferably a check valve. Also in the up side 28 of compression chamber 23 adjacent the first end 24 of the second piston housing 22, a first compression exhaust means is provided. In the embodiment shown the first compression exhaust means is a first compression exhaust valve 35. While the Figures show a single exhaust valve 35, more than one valve can be provided as part of the first compression exhaust means.

A first conduit means 36 connects the first compression exhaust valve 35 in the compression chamber 23 with the second air intake port 14 of combustion chamber 3. When valve 35 and port 14 are open air from the compression chamber 23 may pass through conduit 36 into the combustion chamber 3.

Similarly in the down side 29 of compression chamber 23 adjacent the second end 25 of the second piston housing 22, a second compression intake means is provided. In the embodiment shown the second compression intake means is a second compression intake valve 37. While the figures shown a single compression intake valve 37, more than one valve can be provided as part of the first compression intake means. The second compression intake valve 37 is preferably a check valve. Also in the down side 29 of compression chamber 23 adjacent the second end 25 of the second piston housing 22, a second compression exhaust means is provided. In the embodiment shown the second compression exhaust means is a second compression exhaust valve 38. While the Figures shown a single exhaust valve 38, more than one valve can be provided as part of the second compression exhaust means.

A second conduit means 39 connects the second compression exhaust valve 38 in the compression chamber 23 with the first air intake port 12 of combustion chamber 3. When valve 38 and port 12 are open air from the compression chamber 23 may pass through conduit 38 into the combustion chamber 3.

The double action piston assembly 1, preferably includes means to introduce water vapour into the compression chamber 23 and combustion chamber 3. Water vapour is used to cool the piston 6, central power rod 8 and the first piston housing 2 of the combustion chamber 3. In addition the water vapour helps lubricate the inside walls 20, 42 of combustion chamber 3 and compression chamber 23. In the embodiment shown, water vapour is preferably introduced through venturi 40, 41 or like method, as fresh air is drawn into compression chamber 23 through the first and second compression intake valves 34, 37. When the first and second air intake ports 12, 14 of combustion chamber 3 are opened, the moist air from the compression chamber 23 is fed into the combustion chamber 3 as described below.

The inside wall 42 of the second piston housing 22 may be adapted to reduce friction with the second piston 27. The embodiment illustrated utilizes a coating 43 on the inside walls 42 of the second piston housing 22 for this purpose.

The operation of the double action piston assembly will now be described with reference to the figures, in particular FIGS. 1-7 which illustrate the movement of piston 6 and the opening and closing of the various ports and valves.

The piston 6 of the present invention, as noted previously, is a double action piston, in which the piston is pushed in the up stroke as well as the down stroke. It is understood that the reference to up and down are used for reference purposes only. The figures actually show the double action piston assembly in a horizontal configuration. In this configuration "up", with respect to movement of the pistons 6, 27 would refer to movement to the left in FIGS. 1 to 7. The reference to "down", with respect to movement of the pistons 6, 27 would refer to movement to the right in FIGS. 1 to 7. While the expressions "upwardly" and "downwardly" are used in the following description it is for reference only. The compression and combustion chambers can be arranged in any alignment.

Referring to FIG. 1, the location of the pistons 6, 27 are shown at a point of commencing a first power sequence. At this point, the first and second air intake air ports 12, 14 and first and second exhaust ports 13, 15 of the combustion chamber 3 are open. An air-fuel mixture is fed into the "up side" 10 of combustion chamber 3 through fuel injector 16. An ignition spark set by one or more spark plugs 18, ignites the fuel mixture and forces the piston 6 "downwardly" in the combustion chamber 3 (in FIG. 1 to the right). While the present invention is explained with reference to fuel injection, the fuel mixture can be fed to the combustion chamber by other known means. Such other methods are included within the scope of the present invention.

Figure 2:
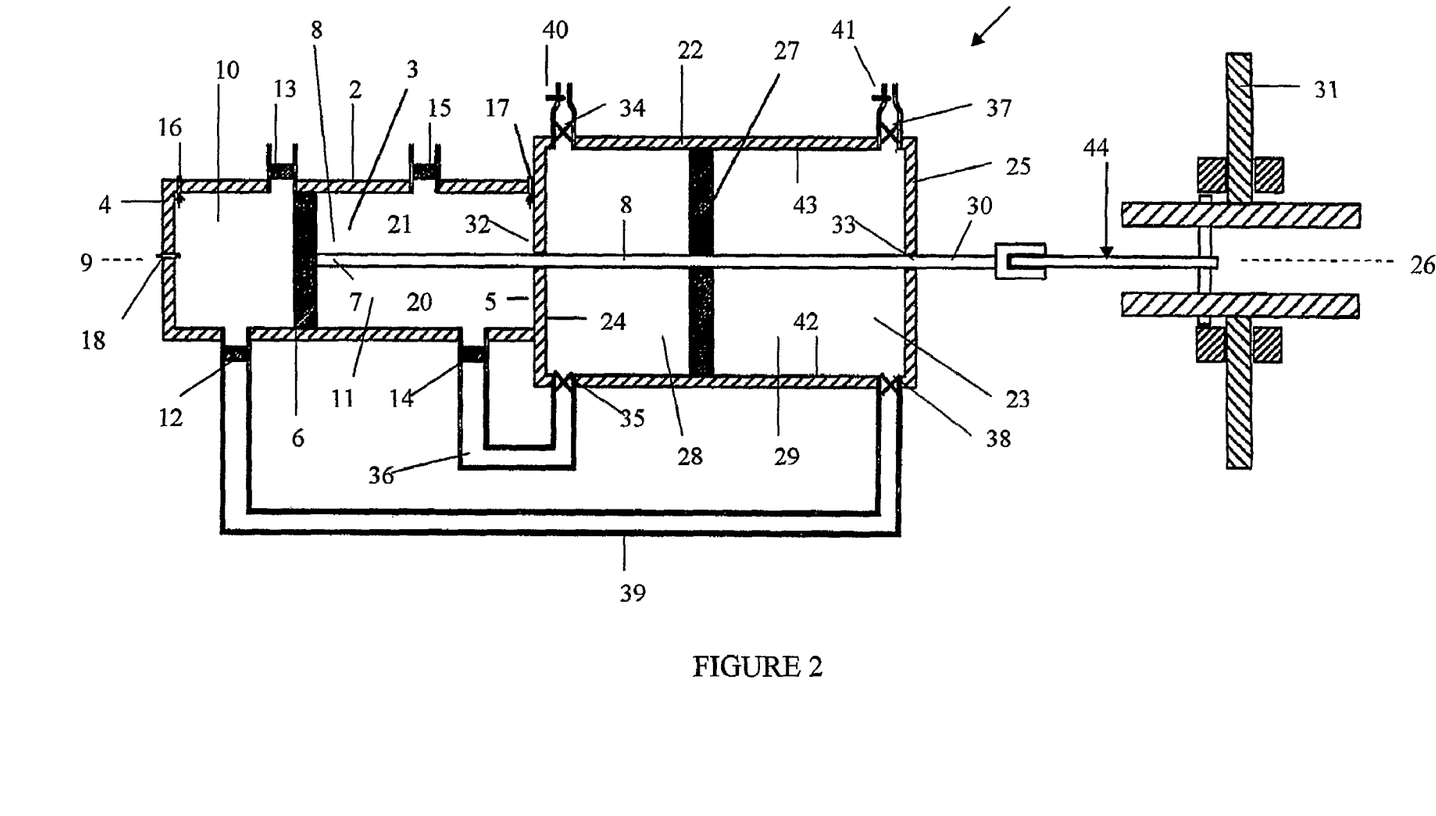
FIG. 2 is a schematic diagram in cross section, of the double action piston assembly of FIG. 1 showing the position of the double action piston immediately after a first ignition and commencement of the "down" stroke.

FIG. 2 shows the position of the pistons 6, 27 as downward movement is initiated by the combustion of the fuel mixture fed into the up side 10 of combustion chamber 3. At this point the first and second air intake air ports 12, 14 and first and second exhaust ports 13, 15 of the combustion chamber 3 are all closed. The movement of piston 6 results in a similar movement of piston 27 in compression chamber 23 because it is connected to central power rod 8. On the down side 11 of piston 6 in combustion chamber 3, the air is being compressed during the downward movement of piston 6. As piston 27 moves "downwardly" in the compression chamber 23 (in FIG. 1 to the right) the air on the "down" side 29 of piston 27 is compressed. On the "up side" 28 of piston 27, water vapour is preferably introduced through venturi 40, or like method, as fresh air is drawn into compression chamber 23 through first compression intake valve 34.

Figure 3:
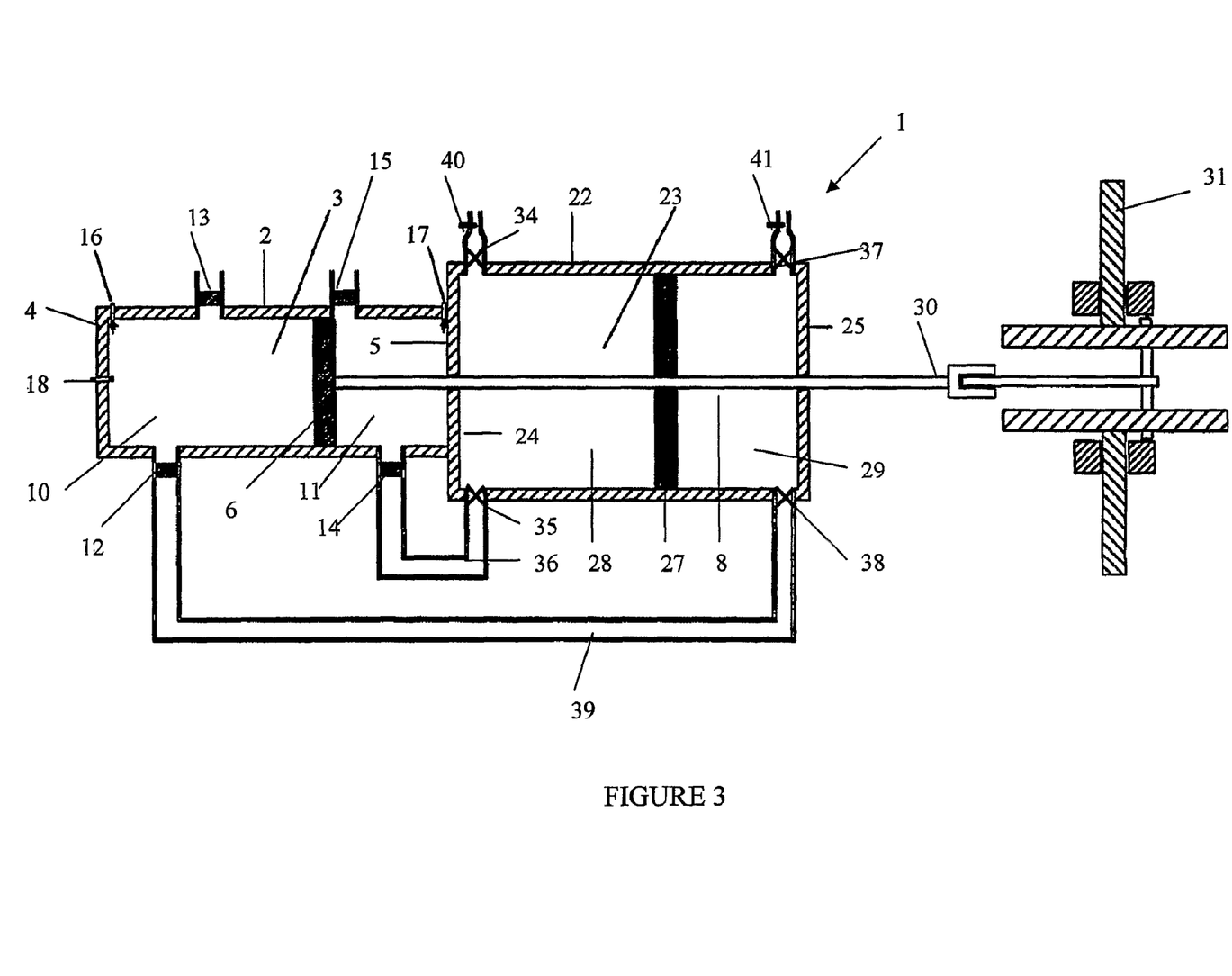
FIG. 3 is a schematic diagram in cross section, of the double action piston assembly of FIG. 1 showing the approximate position of the double action piston as the "down" stroke is nearing completion.

FIG. 3 shows the position of the pistons 3, 10 as the down stroke is nearing completion. At this point the first and second air intake air ports 12, 14 and first and second exhaust ports 13, 15 of the combustion chamber 3 are all still closed. At this time or shortly thereafter an air-fuel mixture may be fed into the "down side" 11 of combustion chamber 3 through fuel injector 17. On the "up side" 28 of piston 27, water vapour is still being introduced through venturi 40 together with fresh air through first compression intake valve 34.

Figure 4:
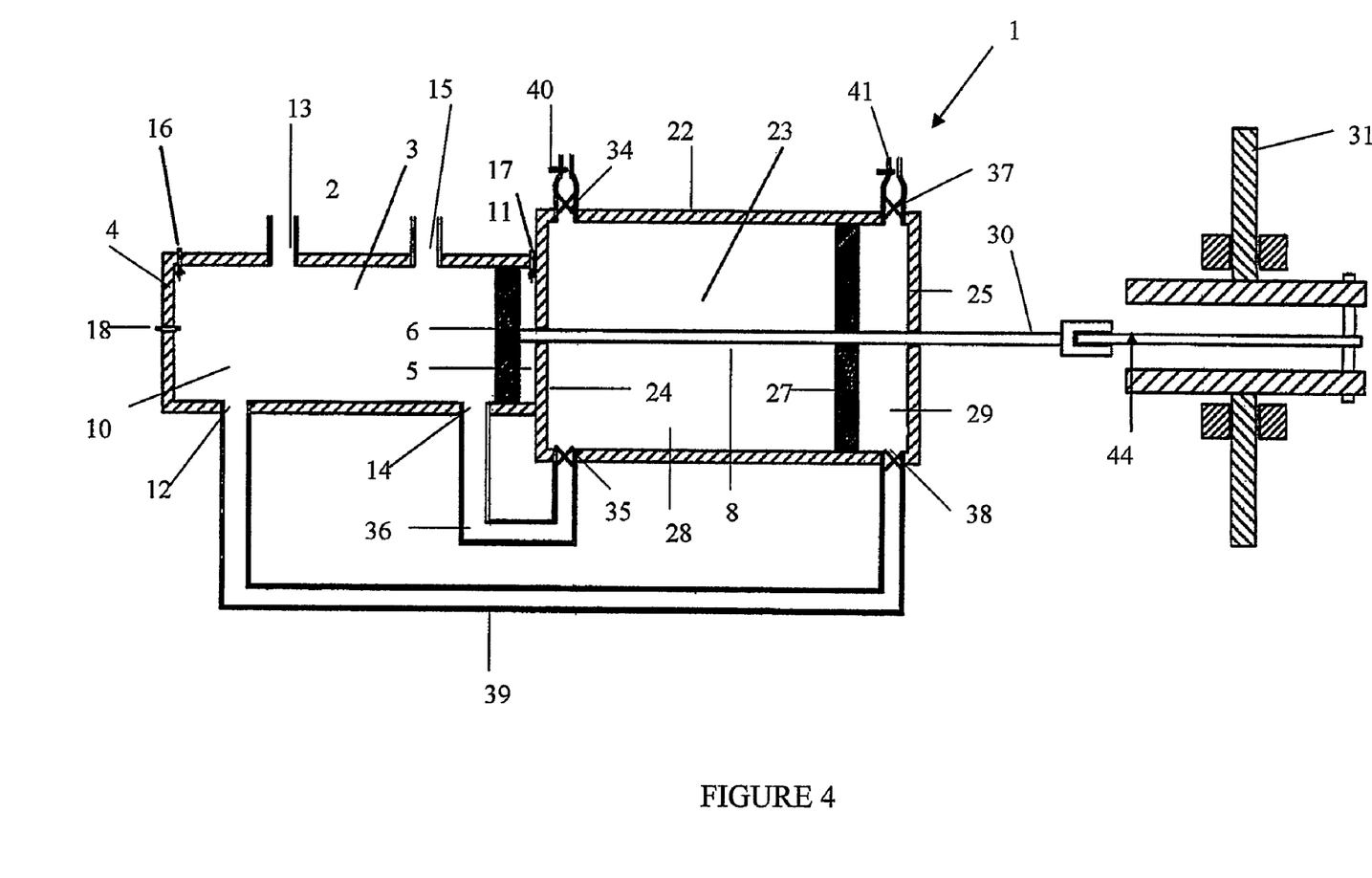
FIG. 4 is a schematic diagram in cross section, of the double action piston assembly of FIG. 1 showing the position of the double action piston after completion of the "down" stroke.

On completion of the down stroke, as shown in FIG. 4, first compression intake valve 34 on compression chamber 23 closes. The second compression exhaust valve 38 in compression chamber 23 opens allowing the compressed air on the down side 29 of piston 27 in compression chamber 23 to pass through second conduit means 39 and first combustion intake port 12 into combustion chamber 3. At the same time the first compression exhaust valve 35 in compression chamber 23 opens allowing the moist air on the up side 28 of piston 27 from compression chamber 23 to pass through first conduit means 36 and the first combustion intake port 12. This influx of air into the combustion chamber 3 scavenges the exhaust gases from combustion on the up side 10 of piston 6 in combustion chamber 3. The combustion gases are exhausted through first and second exhaust ports 13, 15 in combustion chamber 3. At this point first and second compression intake valves 34, 37 in compression chamber 23 are closed. As noted previously a disadvantage of conventional two stroke engines is that a lot of exhaust gases are generated and not all of the exhaust gases are scavenged from the combustion chamber. In the present invention less exhaust gases are retained in the combustion chamber due to the double scavenging of the combustion chamber 3. This results in more efficient operation of the engine. The exhaust gases may be handled in a manner to protect the environment by recycling a portion of the exhaust gases into the air-fuel mixture or passing them through a catalytic converter.

As noted above, as the full down stroke of the piston 6 is almost carried out, an air-fuel mixture is fed into the down side 11 of combustion chamber 3 through fuel injector 17. After the down stroke is completed, an ignition spark by one or more spark plugs 19 ignites the fuel mixture and forces the piston 6 upwardly (to the left in FIGS. 1-7). As shown in FIG. 8, there are preferably three spark plugs 19 provided around the periphery of combustion chamber 3 on the down side 11 of piston 6. In the embodiment shown only one spark plug 18 is provided at the first end 4 of combustion chamber 3 on the up side 10 of piston 6.

Figure 5:
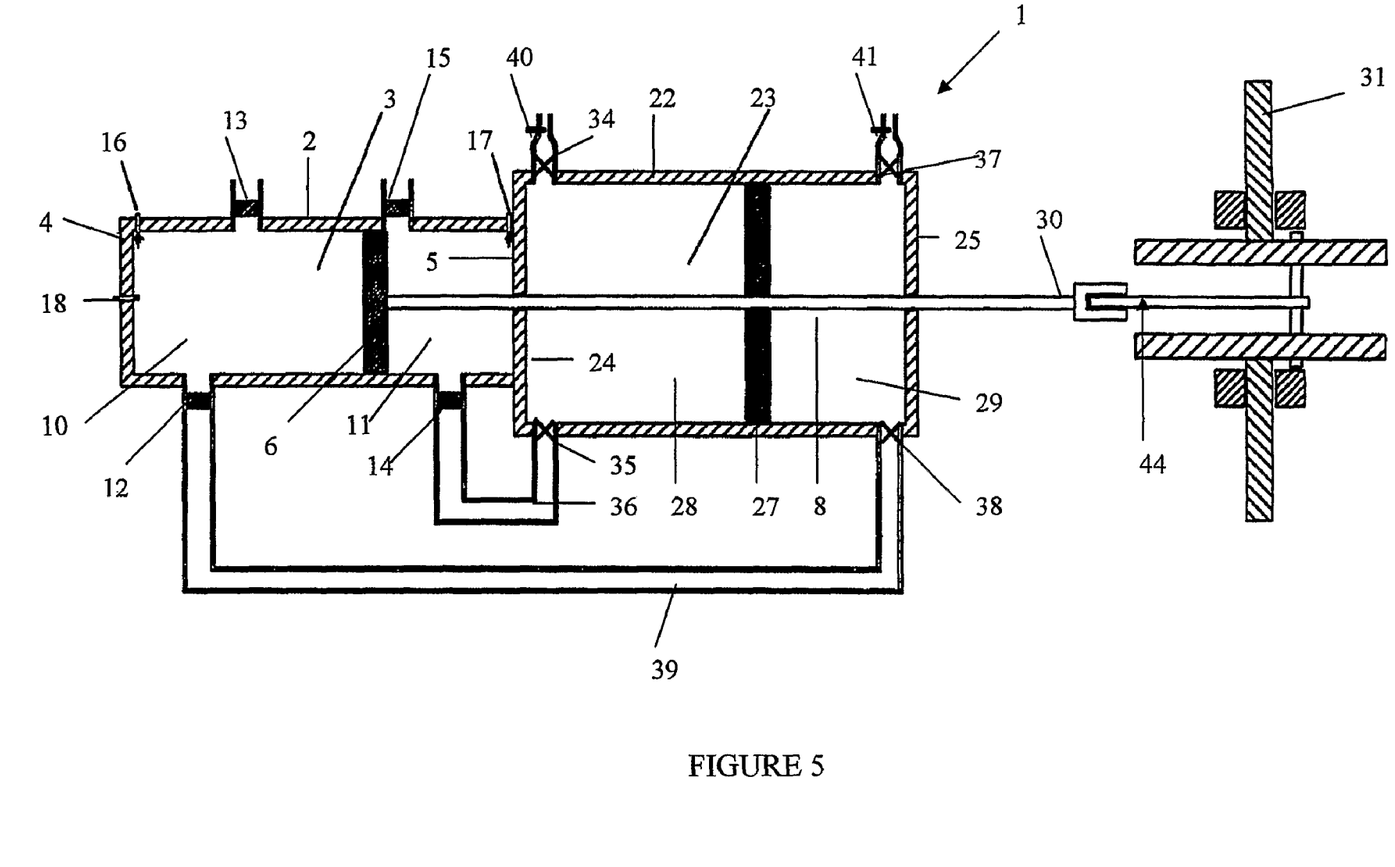
FIG. 5 is a schematic diagram in cross section, of the double action piston assembly of FIG. 1 showing the position of the double action piston immediately after a second ignition and commencement of the "up" stroke.

FIG. 5 shows the position of the pistons 6, 27 as upward movement is initiated by the combustion of the fuel mixture fed into the down side 11 of combustion chamber 3. At this point the first and second air intake air ports 12, 14 and first and second exhaust ports 13, 15 of the combustion chamber 3 are all closed. On the up side 10 of piston 6 in combustion chamber 3, the moist air is being compressed during the upward movement of piston 6. Compression of the moist air will result in condensation of the water vapour and cooling of the piston 6 and inside walls 20 of combustion chamber 3. As second piston 27 moves "upwardly" in the compression chamber 23 (in FIG. 5 to the left) the air/water vapour on the "up" side 28 of piston 27 is compressed. Compression of the air/water vapour on the "up" side 28 of piston 27 causes the water vapour to condense and cool power rod 8. On the "down side" 29 of piston 27 water vapour is introduced into the compression chamber 23 through a second venturi 41 together with fresh air through second compression intake valve 37 in the compression chamber 23.

Figure 6:
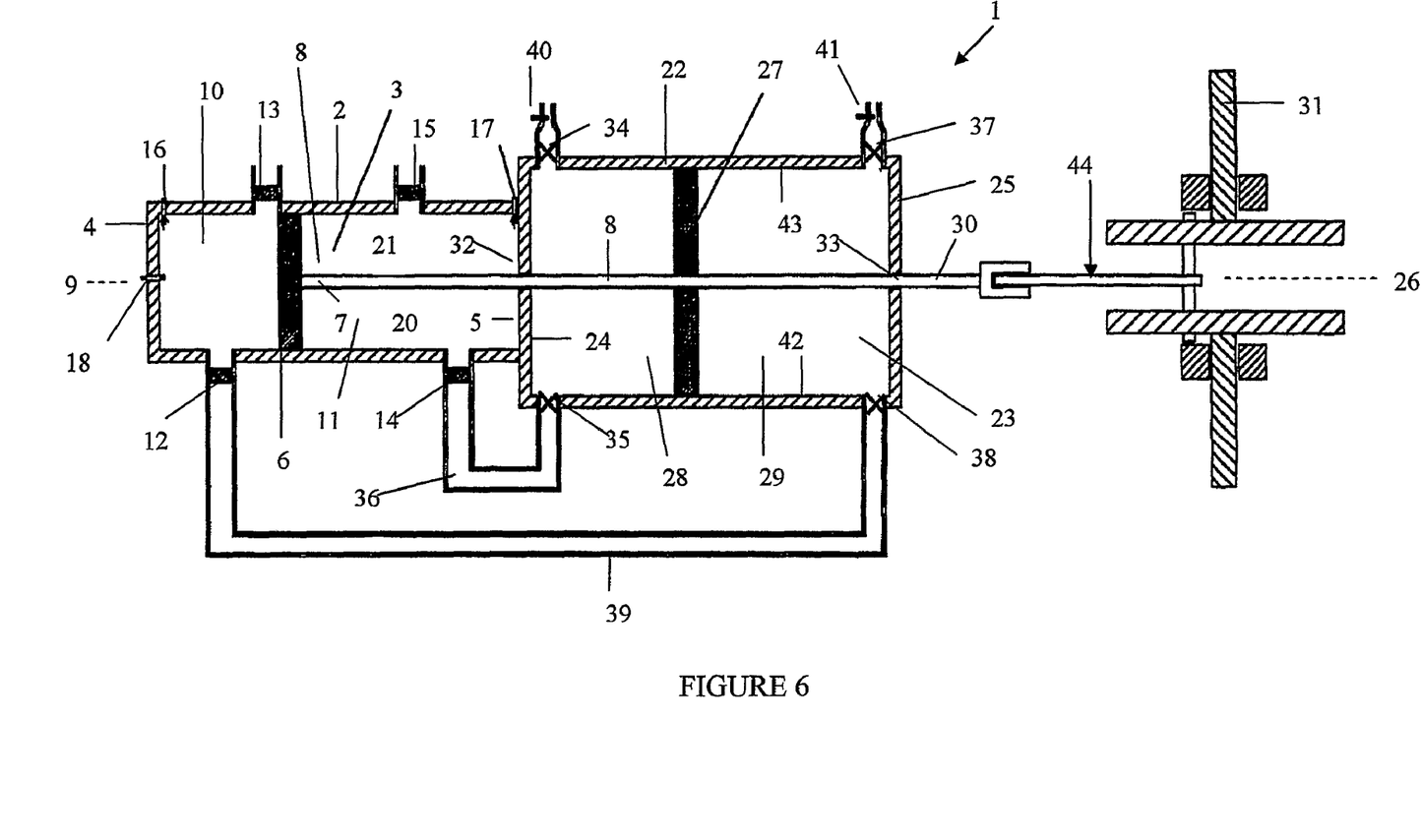
FIG. 6 is a schematic diagram in cross section, of the double action piston assembly of FIG. 1 showing the approximate position of the double action piston as the "up" stroke is nearing completion.

FIG. 6 shows the position of the pistons 6, 27 as the up stroke is nearing completion. At this point the first and second air intake air ports 12, 14 and first and second exhaust ports 13, 15 of the combustion chamber 3 are all still closed. At this time an air-fuel mixture may be fed into the "up side" 10 of combustion chamber 3 through fuel injector 16. On the "down side" 29 of piston 27, water vapour is still being introduced into the compression chamber 23 through venturi 41 together with fresh air through the second compression intake valve 37.

Figure 7:
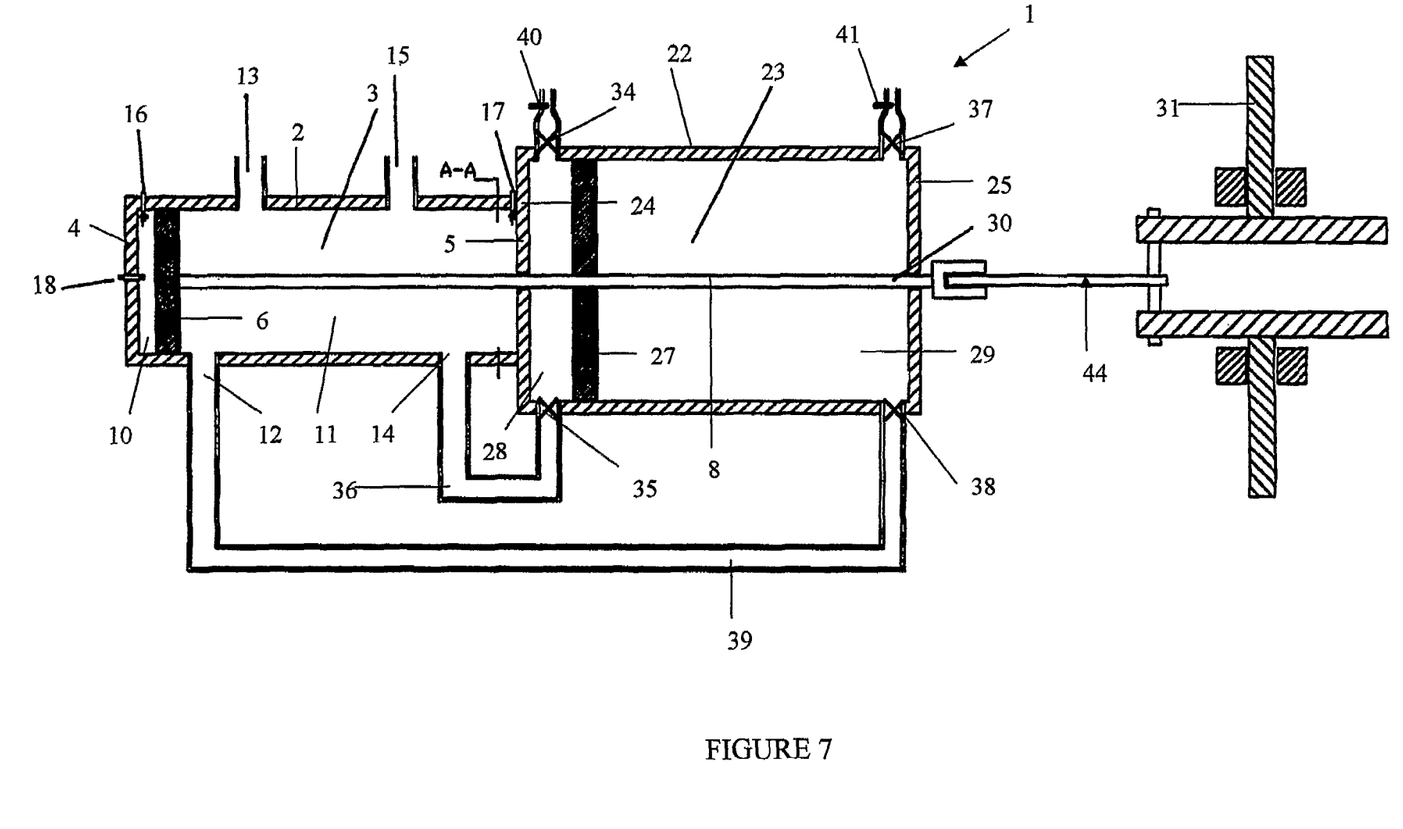
FIG. 7 is a schematic diagram in cross section, of the double action piston and valve assembly of FIG. 1 showing the position of the double action piston after completion of the "up" stroke.

On completion of the up stroke, as shown in FIG. 7, the second compression intake valve 37 in compression chamber 23 closes. The first compression exhaust valve 35 in compression chamber 23 opens allowing the moist compressed air on the up side 28 of piston 27 from compression chamber 23 to pass through first conduit means 36 and second combustion intake port 14 into combustion chamber 3. At the same time second compression exhaust valve 38 in compression chamber 23 opens allowing the moist air on the down side 29 of piston 27 from compression chamber 23 to pass through second conduit means 39 and first combustion intake port 12 into the combustion chamber 3. This influx of moist air scavenges the gases from combustion on the down side 11 of piston 6 in combustion chamber 3. The combustion gases are exhausted through first and second exhaust ports 13, 15 in combustion chamber 3. At this point compression intake valves 34, 37 in compression chamber 23 are closed.

After the full up stroke of the piston 6 is carried out, the cycle is repeated with the sequences shown in FIGS. 1 to 7. As the cycle is repeated there is now moist air on both the up side 10 and down side 11 of piston 6.

As noted above as water vapour is introduced into the combustion chamber 3 and compression chamber 23 it cools pistons 6, 27 and central power rod 8. As the water vapour/air in the combustion chamber 3 and compression chamber 23 is compressed it condenses thereby permitting a greater compression ratio in the combustion chamber without pre-ignition.

In addition, the water vapour is introduced into the combustion chamber 3 through conduits 36, 39 during scavenging of the gases from combustion. In the embodiment illustrated the moist air from compression chamber 23 is introduced into combustion chamber 3 at approximately two atmospheres. The water vapour is present during combustion in the subsequent ignition cycle. When combustion occurs the water vapour is atomized as a result of the heat and pressure. The oxygen and hydrogen released enter into the reaction providing a more complete combustion, improve flame propagation speed, insure homogeneity of the burn, increase oxidation of radicals and increasing efficiency due to the presence of additional oxygen and hydrogen. On the other side of the piston 6 in combustion chamber 3 as the moist air is compressed, the water vapour condenses on the power rod 8 and/or the inside of the wall of the compression chamber housing to cool and lubricate the combustion chamber.

As noted previously, one end 30 of central power rod 8 is connected to crankshaft 31 by conventional linkage 44. Linkage 44 translates the linear motion of the central power rod 8 into rotary motion of crankshaft 31.

The engine of the present invention provides for numerous advantages over prior art engines including:
1. simple construction—few moving parts
2. high efficiency—low friction. The engine of the present invention generates power on each stroke/movement of piston 3. It is anticipated that the engine of the present invention will, for the same number of combustion chambers and associated pistons, generate two times more power than a comparable two stroke engine and four times more power than a four stroke engine.
3. easy maintenance
4. small size and weight
5 environmentally friendly
6. low production cost Having illustrated and described a preferred embodiment of the invention and certain possible modifications thereto, it should be apparent to those of ordinary skill in the art that the invention permits of further modification in arrangement and detail. All such modifications are covered by the scope of the invention.

The embodiments of the invention in which an exclusive property or privilege is claimed are defined as follows:

1. A double action piston assembly for an internal combustion engine said double action piston assembly comprising:

a combustion chamber having a first end and a second end and containing a double action piston connected to a power rod disposed within said combustion chamber, said combustion chamber having an up side and a down side, a first intake air port and a first exhaust port located in the up side of the combustion chamber, a second intake air port and a second exhaust port located in the down side of the combustion chamber, a valve assembly for opening and closing the first and second intake air ports and first and second exhaust ports, a compression chamber having a first end and a second end, said first end of the compression chamber connected to the second end of said combustion chamber, said power rod passing through the second end of said combustion chamber into said compression chamber and out the second end of said compression chamber, a second piston attached to said power rod within said compression chamber, said compression chamber having an up side and a down side, a first compression intake valve and a first compression exhaust valve located in the up side of the compression chamber, a second compression intake valve and a second compression exhaust valve located in the down side of the compression chamber, first conduit means connecting the first intake air port in the combustion chamber with the second compression exhaust valve in the compression chamber, second conduit means connecting the second intake air port in the combustion chamber with the first compression exhaust valve in the compression chamber, means to introduce water vapor into the combustion chamber located in each of the first and second compression intake valves to provide water vapor alternately into the up and down side of the compression chamber, means to alternately feed a fuel mixture into the up side and a down side of the combustion chamber and ignition means consisting of two or more spark means adjacent each of the first and second ends of the combustion chamber to ignite said fuel mixture, wherein at the end of each stroke of the double action piston, the first and second compression exhaust valves in said compression chamber are opened and the first and second intake ports and the first and second exhaust ports in said combustion chamber are open to permit air from the compression chamber to pass through the first and second conduit means into the combustion chamber for full scavenging of the combustion chamber.

2. A double action piston assembly according to claim 1, wherein the means to introduce water vapor into the combustion chamber comprises a venturi located in each of the first and second compression intake valves to provide water vapor alternately into the up and down side of the compression chamber.

3. A double action piston assembly according to claim 1, wherein the first end of the compression chamber helps to seal the second end of the combustion chamber where the power rod exits.

4. A double action piston assembly according to claim 3, wherein said power rod passes through the second end of said combustion chamber into said compression chamber along its longitudinal axis.

5. A double action piston assembly according to claim 1, wherein the combustion chamber is lined with a ceramic sleeve.

6. A double action piston assembly according to claim 1, wherein a second end of the power rod is connected to a crankshaft of an engine.

7. A double action piston assembly according to claim 1, wherein the first and second compression intake valves and first and second compression exhaust valves are check valves.

8. A double action piston assembly according to claim 1, wherein said power rod is disposed within said combustion chamber along its longitudinal axis.

9. A double action piston assembly according to claim 1, wherein said double action piston disposed within said combustion chamber is connected to one end of a power rod.

\* \* \* \* \*